United States Patent
Kimbrell, Jr. et al.

(10) Patent No.: US 6,541,402 B1
(45) Date of Patent: *Apr. 1, 2003

(54) FLUID SHIELD FABRIC

(75) Inventors: William Carl Kimbrell, Jr., Spartanburg, SC (US); Thomas E. Godfrey, Moore, SC (US)

(73) Assignee: Milliken & Company, Spartanburg, SC (US)

( * ) Notice: Subject to any disclaimer, the term of this patent is extended or adjusted under 35 U.S.C. 154(b) by 225 days.

This patent is subject to a terminal disclaimer.

(21) Appl. No.: 09/625,474

(22) Filed: Jul. 25, 2000

Related U.S. Application Data

(63) Continuation of application No. 09/286,797, filed on Apr. 6, 1999, now Pat. No. 6,136,730, which is a continuation-in-part of application No. 08/799,790, filed on Feb. 12, 1997, now Pat. No. 5,899,783.

(51) Int. Cl.$^7$ .................. B32B 27/04; D06M 15/507
(52) U.S. Cl. .................. 442/62; 442/82; 442/85; 442/86; 442/88; 442/92; 442/94; 442/164
(58) Field of Search ............. 442/62, 82, 85, 442/86, 88, 92, 94, 164

(56) References Cited

U.S. PATENT DOCUMENTS

| | | | | | |
|---|---|---|---|---|---|
| 4,355,065 | A | * | 10/1982 | DeMott | 428/195 |
| 4,610,918 | A | * | 9/1986 | Effenberger et al. | 428/245 |
| 5,207,962 | A | * | 5/1993 | Hovis et al. | 264/145 |
| 5,565,265 | A | * | 10/1996 | Rubin et al. | 428/265 |
| 6,136,730 | A | * | 10/2000 | Kimbrell, Jr. et al. | 442/62 |

\* cited by examiner

*Primary Examiner*—Elizabeth M. Cole
*Assistant Examiner*—Jeremy R. Pierce
(74) *Attorney, Agent, or Firm*—Terry T. Moyer; Thomas L. Moses

(57) ABSTRACT

An improved fabric for use in applications such as furniture upholstery is provided which possesses desirable flexibility, cleanability, and fluid resistant properties. The fabric includes a textile substrate treated with a fluorochemical stain resist agent. The treated textile substrate is covered substantially on the back with a layer of extrusion coated thermoplastic polymer which is pressed at least partially into the fabric substrate. A process for forming the fluid shield fabric according to the present invention is also provided. Preferably, the fabric is comprised of solution dyed nylon and the polymeric material is ethylene methyl acrylate polymer.

4 Claims, No Drawings

FLUID SHIELD FABRIC

CROSS-REFERENCE TO RELATED APPLICATIONS

This application is a continuation of U.S. patent application Ser. No. 09/286,797, filed on Apr. 6, 1999, now U.S. Pat. No. 6,136,780, which is a continuation-in-part of co-pending application of U.S. patent application Ser. No. 08/799,790, filed on Feb. 12, 1997, which issued as U.S. Pat. No. 5,899,783 to William C. Kimbrell, Jr. et al. for Fluid Shield Fabric. These references are incorporated herein by reference.

FIELD OF THE INVENTION

The present invention relates to a fabric useful in upholstery applications and more particularly to a fabric having antimicrobial and stain resistant properties in combination with a fluid barrier coating which does not adversely affect the tactile hand of the fabric. A method for forming such fabric is also provided.

BACKGROUND OF THE PRIOR ART

Heretofore, a number of approaches have been taken to making fabrics both cleanable and liquid resistant so as to be more useful in environments where liquid staining is likely to occur. Vinyl coated fabrics have been most broadly accepted for these purposes due to relatively easy cleanability and fairly low cost. However, such vinyl coated fabrics are typically rather stiff to the touch and thereby lack the desired appearance and feel for use in environments such as restaurants, nursing homes, and the like where pleasing tactile and visual perceptions by the user are considered important. Surface laminated fabrics have been utilized to enhance the aesthetic characteristics of the fabrics, but due to the generally disjunctive adherence between the laminate film and the fabric itself, these products tend to peel, crack, and delaminate after long periods of use. Such laminated products also tend to lack the generally desirable feel of standard upholstery products.

Adherence of a liquid barrier film or coating to a fabric substrate is made all the more difficult when fluorochemical stain-resist treatments are applied, since such compositions by their nature tend to repel an applied coating.

The present invention overcomes these seemingly contradicting requirements of fluorochemically based stain resistance in combination with a strongly adherent fluid barrier shield through proper selection of the base textile material in combination with the selection of coating materials and application processes so as to permit a very thin layer (preferably less than 0.010 inches) of barrier material to be applied. Moreover, the actual material making up this barrier layer preferably possess elastomeric properties which tend to conform substantially to those of the fabric substrate. The present invention therefore represents a useful advancement over present practices.

OBJECTS AND SUMMARY OF THE INVENTION

In light of the foregoing, it is a general object of the present invention to provide a fabric which possesses both stain resist and fluid barrier properties but which also exhibits a soft fabric hand as in traditional untreated upholstery fabrics where a soft fabric hand is understood to mean flexibility and/or lack of stiffness in the fabric itself.

It is a more particular object of the present invention to provide a fabric wherein a barrier coating of thermoplastic polymeric material including elastomeric components is adhered in stable relation to a fluorochemically treated surface.

It is yet a more particular object of the present invention to provide a fluid shield fabric useful in upholstery applications possessing a barrier coating of thermoplastic polymeric material in stable relation to a fluorochemically treated surface of a woven, knitted, or nonwoven fabric substrate.

Yet another object of this invention is to provide an aesthetically pleasing woven fabric possessing the same characteristics described above and also exhibiting a certain resistance to chlorine bleach dye removal.

Other objects, advantages and features of the present invention will, no doubt; occur to those skilled in the art upon reading of the following specification. Thus, while the invention will be described and disclosed in connection with certain preferred embodiments and procedures, it is by no means intended to limit the invention to such specific embodiments and procedures. Rather, it is intended to cover all such alternative embodiments, procedures, and modifications thereto as may fall within the true spirit and scope of the invention as defined only by the appended claims and equivalents thereto.

DESCRIPTION OF THE PREFERRED EMBODIMENT

A fluid shield fabric is provided wherein the fabric exhibits a good hand while maintaining intimate adhesion between the base fabric and the polymeric barrier material despite the use of an intermediate fluorochemical composition. In the potentially preferred practice of the present invention, a woven fabric substrate is treated with a fluorochemical stain resist agent and thereafter extrusion coated substantially on the back side with a layer of thermoplastic polymeric material so as to yield a final construction which exhibits both fluid and stain resistant properties.

The fabric substrate is preferably a woven material although it is contemplated that tightly formed knitted materials and/or nonwovens as are known to those of skill in the art may likewise be used if desired. Such fabric substrates are preferably formed from solution dyed nylon yarns although it is contemplated that other materials including, by way of example only and not limitation, cotton-polyester blends, other nylon fibers, polyesters, and polypropylene may also be utilized. It is believed that it is the intimate contact over a relatively large effective surface area as provided by the extrusion coating practice which permits the substantial physical adherence of the coating to the substrate even at low levels of polymer application. The woven fabric may be woven in any type of pattern, such as Jacquard, for example.

In one particularly preferred embodiment, it has been found that the use of solution dyed nylon yarn in a woven fabric substrate provides excellent prevention of discoloration due to chlorine bleach exposure, no matter what type of polymeric material is utilized as a barrier layer. However, other yarn types may also be utilized most notably with the preferred polyurethane or acrylate polymer barriers.

It has been further found that through use of a polymeric material which includes an elastomeric component therein, high degrees of flexibility can be achieved without the occurrence of delamination. Also, such polymeric materials must be able to withstand possible dissolution when in contact with cleaning solvents and compositions associated with fabric care (such as isopropyl alcohol, acetone, mineral spirits, and the like), must exhibit suitable viscosity for ease in manufacturing of the target fabric, and must possess hydrostatic capability to perform well as a barrier layer. Coating materials which may be used include by way of example only, acrylate polymers (such as methacrylate polymers), polyurethanes, polypropylene compositions, PET polyester compositions, PBT polyester compositions, elastomeric polyethylene, and metallocene polyethylene compositions. The invention may be further understood and illustrated through reference to the following non limiting examples. Preferably, polyurethanes and acrylate polymers are utilized and most preferably extruded methacrylate (ethylene methyl acrylate, for instance) is the polymeric material.

EXAMPLE

The following example describes the preparation of fabric according to the present invention intended for dye application. A woven fabric having a 150 denier warp with 133 ends and a 690 denier (textured) fill with 45 ends was formed from solution dyed nylon yarn (available from Cookson Fibers under the tradename Camac™) on a Jacquard loom to yield a 100% Jacquard weave nylon woven fabric.

The loom state fabric was thereafter scoured and thereafter padded on both sides with a solution containing about 1%–40% (about 6.6% preferred) of a fluorochemical such as MILLIGUARD™ BK 96 a fluoroacrylate copolymer emulsion from Milliken Chemical in Spartanburg, S.C.; about 0.5%–5.0% (about 3.0% preferred) ULTRA-FRESH NM™; and about 0.05%–1.0% (about 1.0% preferred) ULTRA-FRESH 40™ (both available from Thompson Research) with the remainder of the solution being made up of water.

While in the preferred practice, this solution will include an antimicrobial component, it is to be understood and appreciated that one or more of these additional components may be eliminated if desired. Following the padding application of this preparation solution, the fabric is cured at a temperature of about 225° F. to 425° F. preferably about 350° F. for 60 seconds. The woven fabric substrate with applied fluorochemical stain resist agent is thereafter heated to a temperature of about 90° to 410° F. (225° F. preferred) and passed to an extrusion coater.

As will be appreciated by those of skill in the art, extrusion coating involves the process of extruding a molten film from a die and contacting this molten film with the fabric substrate under pressure in the nip of two counter-rotating rolls. In the preferred practice, one of these rolls is a chill roll which is in contact with the surface being coated while the other roll is a deformable rubber material which is in contact with the side remaining uncoated. Through use of such a configuration and in the preferred embodiment, a layer of molten ethylene methyl acrylate (EMA) having 20% MA substitution on the ethylene backbone, is spread across and forced into the fabric which has undergone fluorochemical treatment. This molten EMA is preferably applied at a temperature of about 580° F. while the chill roll is preferably held at a temperature of about 55° F. One potentially preferred (EMA) composition is EMA 806-009, available from Equistar Chemicals of Cincinnati, Ohio, which includes an elastomeric component therein. Necessarily injected within the manufacturing operation is a wax or wax-like chemical which acts as a release agent for the EMA when in contact with the chill roll. Such a chemical, such as Acrawax from Lonza Chemical, thus allows for a continuous, clean application of the preferred EMA which, without a release agent, would remain contacted with the chill roll and "gum up" the extruson apparatus. The line speed of the fabric itself is preferably about 100 feet per minute through the machine. This operation leads to a configuration wherein the EMA coating substantially covers and surrounds the yarn of the fabric over a large surface area so as to promote good mechanical adhesion. In addition, the coating material is pressed into the interstices which may still exist between the individual yarns so as to provide a barrier to fluid passage therebetween. In the preferred practice, the total thickness of the applied barrier layer is between about 1.00 and 5.00 mils, preferably between about 1.50 and 2.50 mils, and most preferably between about 1.75 and 2.25 mils.

It is contemplated that additional performance enhancing constituents may be incorporated within the thermoplastic polymeric materials which are extrusion coated onto the fabric substrate. These performance enhancing constituents may include, by way of example only and not limitation, antimicrobial compositions, and/or ultraviolet stabilizing agents such as are known to those of skill in the art.

In light of the above disclosure of potentially preferred embodiments and processes, it will be appreciated that the general principal of invention disclosed herein may be applied in a variety of ways. Therefore, it is contemplated by the appended claims to cover any such modifications and other embodiment as incorporate the features of this invention within the broadest allowable scope thereof.

What is claimed is:

1. A fluid shield fabric comprising:
    a fabric substrate, a fluorochemical stain resist agent substantially covering said
    fabric substrate, and a layer of thermoplastic polymeric material in overlaying relation to said fluorochemical stain resist agent covering said fabric substrate, said thermoplastic polymeric material having been applied to said fabric substrate by means of extrusion coating such that said thermoplastic polymeric material at least partially penetrates said fabric substrate, wherein said fabric substrate is selected from the group consisting of:
    a) polyesters;
    b) cotton polyester blends;
    c) nylons; and
    d) polypropylenes;
    and wherein said thermoplastic polymeric material is selected from the group consisting of polyurethanes and acrylate polymers.

2. The fabric of claim 1 wherein said at least one acrylate polymer is ethylene methyl acrylate.

3. A fluid shield fabric comprising:
    a fabric substrate, a fluorochemical stain resist agent substantially covering a front side and a back side of said fabric substrate, and a layer of thermoplastic polymeric material covering only a back side of said fabric substrate, said thermoplastic polymeric material having been applied to said fabric substrate by means of extrusion coating such that said thermoplastic polymeric material at least partially penetrates said back side of said fabric substrate, wherein said fabric substrate is selected from the group consisting of:
    1) polyesters;
    2) cotton polyester blends;
    3) nylons; and
    4) polypropylenes;
    and where said thermoplastic polymeric material is selected from the group consisting of polyurethanes and acrylate polymers.

4. The fabric of claim 3 wherein said at least one acrylate polymer is ethylene methyl acrylate.

* * * * *